Sept. 29, 1970     I. J. DAVIES     3,531,061
SAFETY HARNESS REEL

Filed March 20, 1968     2 Sheets-Sheet 1

Inventor
Ivor John Davies
By
Dowell Dowell
Attorneys

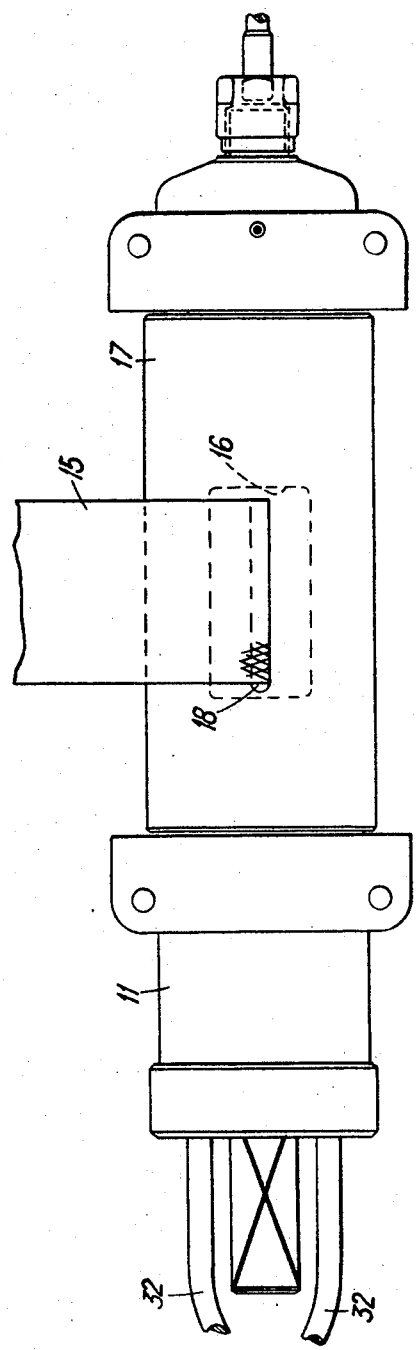

United States Patent Office 3,531,061
Patented Sept. 29, 1970

3,531,061
SAFETY HARNESS REEL
Ivor John Davies, Torpe Bay, England, assignor to Teleflex Products Limited, Basildon, Essex, England, a British company
Filed Mar. 20, 1968, Ser. No. 714,562
Claims priority, application Great Britain, Mar. 20, 1967, 13,042/67
Int. Cl. B65h 75/34
U.S. Cl. 242—107.4                                             6 Claims

ABSTRACT OF THE DISCLOSURE

A ballistic inertia reel for airmen's safety harness is provided in which a harness-retracting gas-operated piston-and-cylinder unit is disposed in end-to-end relationship with the rotary harness reel spool and reel frame. The piston of the piston-and-cylinder unit is coaxial with the harness spool and is in screw-threaded engagement with a screwed shaft that extends axially from a screwed bore in the piston toward the harness spool. A dog clutch has one of its two cooperating rotary elements secured for rotation with the harness spool while the other dog clutch element is mounted on the end of the screwed shaft nearer the reel spool. The dog clutch elements are normally spring-loaded out of engagement. Upon the admission of pressure gas to the cylinder the resulting rectilinear movement of the piston first moves the screwed shaft endwise to engage the dog clutch and then causes forced rotation of the screwed shaft and reel spool.

---

This invention relates to safety harness reels. More particularly, it is concerned with automatic harness reels for airmen and especially reels for use in association with harnesses upon airmen's ejection seats.

Whereas an airman's safety harness should normally give some freedom of movement it is desirable that the harness should hold the wearer closely and tightly to his seat in an emergency or when he is about to be ejected from the aircraft. There is thus a requirement for harness reels that will function automatically to take up slack very rapidly and haul the wearer hard into his seat when the occasion demands. It is an object of the invention to provide a reel that will perform this function.

According to the present invention, a safety harness reel comprises a rotary reel spool or drum, a fluid-pressure-operated piston-and-cylinder unit coaxial therewith, a rotary drive member for engagement with the reel spool, and driving connections for converting the rectilinear motion of the piston-and-cylinder unit into rotary motion of the drive member. In the preferred arrangement, initial rectilinear movement of the piston-and-cylinder unit is effective to engage a clutch coupling the rotary member to the reel spool and subsequent movement serves to rotate the rotary member and reel spool. The rotary member may comprise a screwed shaft received in a recirculating ball thread in the piston.

The pressure fluid for operating the piston-and-cylinder unit may be obtained from a ballistic cartridge, or other suitable source of gas under pressure.

In the preferred arrangement also, an inertia lock is incorporated such that the reel spool is locked against paying out of further strap or cable when a sudden pull is exerted on the strap or cable.

One form of airman's safety harness reel in accordance with the invention will now be described by way of example, with reference to the accompanying drawings, in which:

FIG. 2 is an external view of the reel in the direction of the arrow 2 of FIG. 1.

Figure 1:
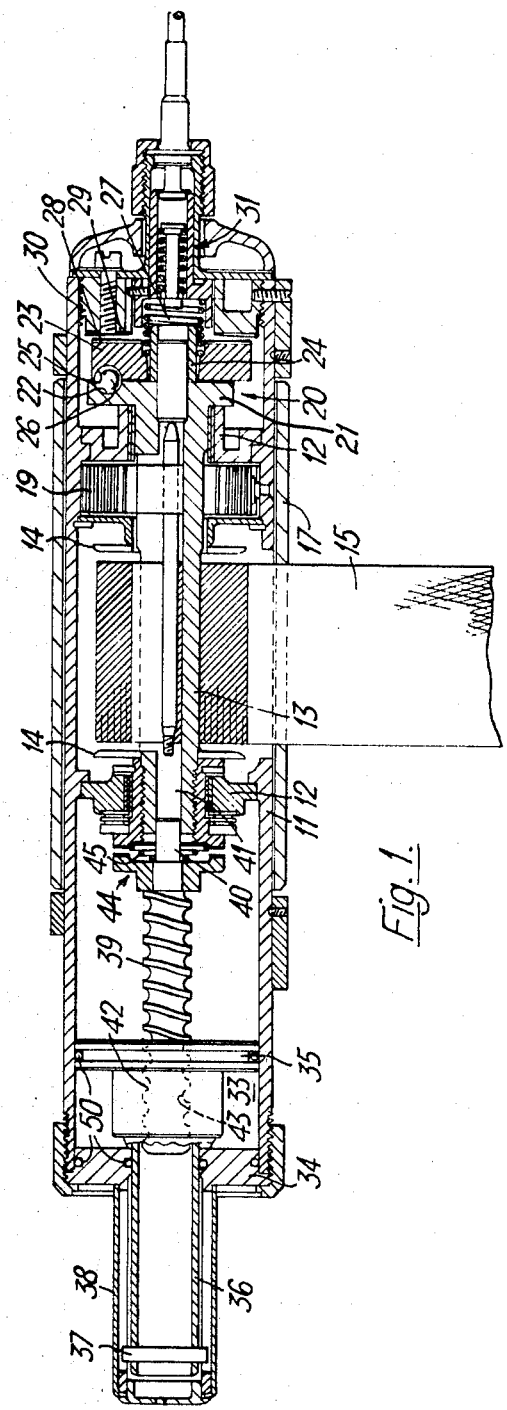
FIG. 1 shows the reel to be described in longitudinal section.

The reel shown in the drawings has a cylindrical casing 11 within which are mounted bearings 12 for a reel spindle 13 that lies axially within the casing. A portion of the spindle 13 between flanges 14 serves as the reel spool on which is spirally wound a harness strap 15 that passes out through an opening 16 in the peripheral wall of the casing 11. A loose outer sleeve 17 surrounds a portion of the casing including the opening 16 and has a narrow slot 18 through which the strap 15 is threaded. This sleeve constitutes a cylindrical webbing guard which is free to rotate, its purpose being to prevent the webbing "roping" when retracted under gas pressure as hereinbefore described. "Roping" of the webbing would cause it to jam on the spool and prevent total reel-in. Toward one end of the reel spindle 13 is surrounded by a spiral retraction spring 19 serving to urge the spindle to rotate in the direction to wind in the strap 15.

Beyond the spring 19 the spindle is provided with an inertia lock 20 of a well-known type. The end of the spindle has integral therewith a drive plate 21 the face of which is formed with a number of hemispherical recesses 22 each having a lead-out of gradually decreasing depth extending in the circumferential direction of the plate. An inertia member 23 mounted loose on a bushing 24 projecting from the end of the spindle lies close up to the recessed face of the drive plate 21 and is formed with similar cooperating recesses 25 in its face next the drive plate, except that the lead-out portions of the recess in the inertia member extend oppositely to those in the drive plate. Balls 26 are lodged in the hemispherical portions of the recesses 22, 25 in the drive plate and inertia member, respectively, and a spring 27 serves to urge the inertia member axially toward the drive plate. As a result the inertia member normally rotates along with the drive plate.

In the event of a sudden pull on the strap 15, causing angular acceleration of the reel spindle beyond a predetermined value, the inertia member 23 lags behind the dive plate 21 in its rotation and this causes the balls 26 to leave the hemispherical portions of the recesses 22, 25 and ride into the lead-out portion of decreasing depth. Consequently, the inertia member 23 is cammed away from the drive plate 21 in the axial direction against the action of the spring 27, which causes teeth 28 on the back of the inertia member to engage with cooperating teeth 29 of a brake ring 30 attached to the end of the casing 11. The inertia member is thus arrested and locked against further rotation, and the reel spindle 13 is likewise locked by reason of jamming of the balls 26 between the inertia member and the drive plate.

As well as the automatic locking facility just described, which responds to a sudden pull on the strap, a cable-operated manual lock 31 is also provided.

At the opposite end of the reel casing 11 there are provided gas lines 32 for supplying high pressure gas to cylinder chamber 33 defined between the end wall 34 of the casing and a piston 35 siliding within the casing. Gas seals are provided as indicated at 50. The piston has a tail rod 36 passing through the casing end wall 34 and previded with an anti-torque pin 37 which slides in channels in a casing extension 38 in order to prevent the piston from rotating. A screwed shaft 39, lying axially within the casing in alignment with the reel spindle, has a plain end spigot 40 which is supported for rotation in a bore 41 in the reel spindle, while its threaded opposite end 42 is received in an axial recirculating ball thread 43 within the piston 35. A dog clutch 44 has one of its two cooperating members keyed on the shaft 39 while the other is keyed on the end of the reel spindle 13. Normally, the two members of the dog clutch are urged out of engagement by a spring 45.

In the oridinary way, the piston 35, and screwed shaft 39 do not interfere with the operation of the reel, the clutch 44 being disengaged and no pressure being applied to the cylinder chamber 33. In an emergency, or upon the airman's initiation of ejection from the aircraft by means of his ejection seat gas under pressure from a ballistic cartridge or other pressure gas source is admitted to the chamber 33 to force the piston 35 to the right as seen in the drawings. To begin with, the screwed shaft 39 moves to the right along with the piston and against the action of the spring 45 until the clutch 44 is engaged. Then, since the shaft 39 cannot move any further to the right, further movement of the piston causes the shaft to rotate by reason of its screw-threaded connection with the piston, and since the dog clutch 44 is engaged the reel spindle 13 is rotated also. The rotation is in the direction to wind in the strap 15 and the result is that the airman is rapidly power-hauled, by the reel acting on his shoulder harness, hard back and down into his seat.

While in the arrangement described a harness strap enters directly into the reel, it will be understood that essentially the same mechanism can be employed in a case where an anchoring cable is connected to the harness straps and the reel comprises a cable drum instead of a strap spool.

What is claimed is:

1. A safety harness reel comprising a reel frame, a harness reel spool mounted for rotation in said frame, a fluid-pressure-operated piston-and-cylinder unit comprising a cylinder and a rectilinearly-moving piston working therein, said reel frame and said cylinder being in mutually end-to-end axially aligned relationship, with said rotary reel spool and said piston sharing a common axis, and driving connections between said piston and said reel spool converting rectilinear motion of said piston into rotary motion of said reel spool, said driving connections comprising a rotary screwed shaft in axial alignment with the reel spool and piston, and a threaded bore in the piston receiving said screwed shaft, means being provided constraining said rectilinearly moving piston from rotation, and said driving connections further including normally-disengaged clutch means engaging at commencement of a rectilinear motion stroke of the piston.

2. A harness reel according to claim 1, wherein a ballistic cartridge provides gas pressure fluid for operating the piston-and-cylinder unit.

3. A harness reel according to claim 1, wherein a spindle of the reel spool has an end bore supporting for rotation a plain end of the screwed shaft opposite said screwed end, and said clutch means comprises a rotary dog clutch having one of two cooperating clutch members secured to said screwed shaft and the other clutch member secured to said spindle, with a spring normally holding said two members of the dog clutch apart, said dog clutch members being urged into engagement upon initial rectilinear movement of the piston and screwed shaft in unison.

4. A harness reel according to claim 1, wherein an inertia lock is associated with the reel spool and locks the reel against further rotation in the pay-out direction when a sudden pull is exerted on a tension member coiled on the spool.

5. A harness reel according to claim 1, wherein said bore in the piston contains a recirculating ball thread.

6. A harness reel according to claim 1, further comprising gas-producing means providing pressure fluid to operate the piston-and-cylinder unit.

References Cited

UNITED STATES PATENTS

| | | | |
|---|---|---|---|
| 3,077,324 | 2/1963 | Strickland | 242—107.4 X |
| 3,162,098 | 12/1964 | Lindberg | 74—89.15 X |
| 3,178,136 | 4/1965 | Bayer | 242—107.4 X |
| 3,215,376 | 11/1965 | Martin | 242—107.4 X |
| 3,389,873 | 6/1968 | Filippi et al. | 297—388 X |

STANLEY N. GILREATH, Primary Examiner

W. H. SCHROEDER, Assistant Examiner

U.S. Cl. X.R.

74—424.8; 244—122